(No Model.)
P. DAVIES.
ATTACHMENT FOR RIMS OF WHEELS.
No. 488,670.  Patented Dec. 27, 1892.
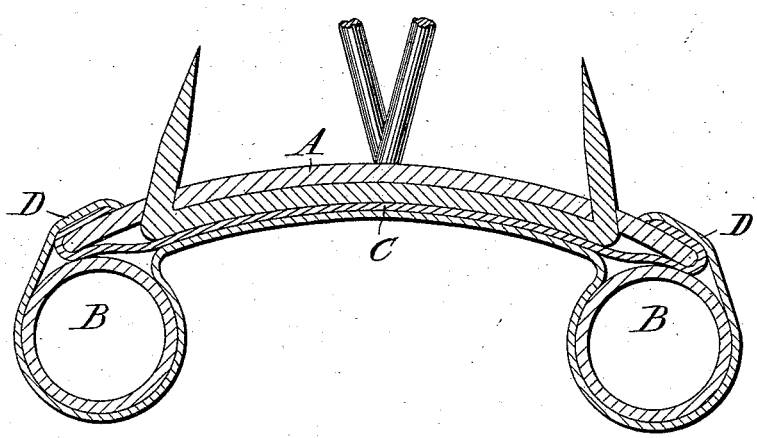
Witnesses.
Chas. F. Sensner
Baltus DeLong.
Inventor.
Preston Davies
By his Atty's.
Baldwin Davidson Wight
THE NORRIS PETERS CO., PHOTO-LITHO., WASHINGTON, D. C.

UNITED STATES PATENT OFFICE.

PRESTON DAVIES, OF LONDON, ENGLAND.

ATTACHMENT FOR RIMS OF WHEELS.

SPECIFICATION forming part of Letters Patent No. 488,670, dated December 27, 1892.

Application filed October 25, 1892. Serial No. 449,957. (No model.) Patented in France May 17, 1892, No. 221,681, and in Belgium May 17, 1892, No. 99,713.

*To all whom it may concern:*

Be it known that I, PRESTON DAVIES, a subject of the Queen of Great Britain, residing at No. 12 Kempson Road, Walham Green, Fulham, London, in the county of Middlesex and Kingdom of England, have invented a certain new and useful Attachment to the Rims of Wheels Intended to Carry Pneumatic and Like Tires, (for which I have received Letters Patent in France, numbered 221,681, and bearing date the 17th day of May, 1892, and in Belgium, numbered 99,713, and bearing date the 17th day of May, 1892,) of which the following is a specification.

In wheels carrying pneumatic and like tires heretofore made considerable damage has been caused by the edges of the metallic rims of such wheels, when weight is upon them, bedding into and chafing the inner or inflated tube of the tire thereby tending ultimately to puncture it. To remedy this defect is the object of my invention.

The annexed drawing, which gives a transverse sectional view of a rim of a wheel, illustrates my invention.

To the rim, A, I affix by solutioning or other suitable means an attachment or compound band. This band contains two tubes, B, composed of india-rubber or its equivalent which are inflated with air or filled with other fluid. They are joined at their ends so as to form two complete circles or rings but with a short connecting tube between them to admit of their being inflated or filled from one valve. To keep these two tubes at the requisite parallel distance apart and to prevent their undue expansion under pressure of inflation or filling they are securely attached, by vulcanizing or other suitable means, to one or more substances of canvas webbing or other suitable material, C, and, D, thus forming a strip or band of a width sufficient to cover the rim as shown. The tubes are preferably inflated or filled to a greater pressure than the main inflated tube of the tire. In this way a protective cushion or buffer is formed between the inner or inflated tube of the tire (which may be of any suitable construction and is not shown in the annexed drawing) and the edges of the rim, A.

Having fully described my invention, what I claim and desire to secure by Letters Patent is—

A protective cushion between the rim of a wheel and its tire consisting of tubes, B, adapted to be filled under pressure from a single valve and provided with one or more coverings, C, and, D, of canvas or other similar material secured to the rim and serving to hold the tubes in position between the edges of the rim and the tire substantially as set forth and illustrated in the annexed drawing.

In testimony whereof I have hereunto subscribed my name.

PRESTON DAVIES.

Witnesses:
CHARLES EVERETT,
A. F. SPOONER.